(12) United States Patent
Block et al.

(10) Patent No.: US 8,365,353 B2
(45) Date of Patent: Feb. 5, 2013

(54) SWIVEL CASTER

(75) Inventors: Wolfgang Block, Wermelskirchen (DE); Manfred Milbredt, Remscheid (DE)

(73) Assignee: TENTE GmbH & Co. KG, Wermelskirchen (DE)

( * ) Notice: Subject to any disclaimer, the term of this patent is extended or adjusted under 35 U.S.C. 154(b) by 12 days.

(21) Appl. No.: 12/932,673

(22) Filed: Mar. 3, 2011

(65) Prior Publication Data
US 2011/0232027 A1   Sep. 29, 2011

(30) Foreign Application Priority Data

Mar. 26, 2010   (DE) .......................... 10 2010 016 155

(51) Int. Cl.
*B60B 33/00*   (2006.01)
(52) U.S. Cl. ...................................................... 16/35 R
(58) Field of Classification Search .................. 16/35 R, 16/19, 32, 33, 35 D, 18 R; 248/188.9, 188.8, 248/188; 5/86.1, 87.1, 510, 600; 280/47.131, 280/47.2, 47.41, 89.1, 88, 89.11, 89.12, 91.1, 280/775; 188/1.12, 25
See application file for complete search history.

(56) References Cited

U.S. PATENT DOCUMENTS

| | | | | | |
|---|---|---|---|---|---|
| 4,339,842 | A | * | 7/1982 | Fontana et al. | 16/32 |
| 4,364,148 | A | * | 12/1982 | McVicker | 16/32 |
| 4,918,783 | A | * | 4/1990 | Chu | 16/19 |
| 5,042,110 | A | * | 8/1991 | Orii | 16/32 |
| 6,055,704 | A | * | 5/2000 | Leibman | 16/35 R |
| 6,491,127 | B1 | * | 12/2002 | Holmberg et al. | 180/252 |
| 6,584,641 | B1 | * | 7/2003 | Milbredt | 16/35 R |
| 6,637,071 | B2 | * | 10/2003 | Sorensen | 16/32 |
| 8,087,126 | B2 | * | 1/2012 | Duvert et al. | 16/33 |
| 8,136,201 | B2 | * | 3/2012 | Yantis et al. | 16/32 |
| 2003/0028997 | A1 | * | 2/2003 | Plate | 16/48 |
| 2006/0010643 | A1 | * | 1/2006 | Hornbach et al. | 16/19 |
| 2007/0056141 | A1 | * | 3/2007 | Armano et al. | 16/35 R |

FOREIGN PATENT DOCUMENTS

DE   43 21 739   1/1995

* cited by examiner

*Primary Examiner* — Chuck Y. Mah
(74) *Attorney, Agent, or Firm* — Collard & Roe, P.C.

(57) ABSTRACT

A swivel caster has a caster body, a pivot bearing and a foot that can be extended by means of an electric motor. The foot has a telescoping foot part. The electric motor is disposed below the pivot bearing, at least below a first, upper bearing.

10 Claims, 8 Drawing Sheets

SWIVEL CASTER

CROSS REFERENCE TO RELATED APPLICATIONS

Applicants claim priority under 35 U.S.C. 119 of German Application No. 10 2010 016 155.1 filed Mar. 26, 2010, the disclosure of which is incorporated by reference.

BACKGROUND OF THE INVENTION

The invention relates to a swivel caster with a caster body, a pivot bearing and a foot which can be extended by means of an electric motor, the foot having a telescopable foot part.

Swivel casters of this kind are already known in various configurations. Reference is made to DE 43 21 739 A1.

In the case of the known swivel caster, the ability to telescope is achieved by a plurality of extending portions, which are guided one within the other and are screw-connected to one another. The arrangement is therefore constructionally complex.

Proceeding from the state of the art noted, the invention is concerned with the objective of providing a swivel caster that has a foot which can be extended by an electric motor, the swivel caster having an advantageous construction.

SUMMARY OF THE INVENTION

A first possible solution to this problem is provided by placing the electric motor below the pivot bearing, at least below an upper, first pivot bearing.

According to the invention, it is known that in a suitable configuration, an electric motor may be provided in the caster body below the pivot bearing. Specifically, a recess in the housing is necessary which is adapted to the dimensions of the electric motor and is of corresponding size. This is however offset by the shorter path to the foot part. It is possible, with a moderate amount of constructional complexity, to achieve the ability for the foot part to telescope.

Further features of the invention are described and illustrated below, also in the description in the figures and in the drawings, often in their preferred association with the concept already explained above; they may however also be of importance in association with only one or more individual features which are described here or illustrated in the drawings, in particular the features of the claims, already dealt with, or independently, or in another overall concept.

Thus it is preferably provided that the electric motor interacts with a gearbox located vertically below the electric motor. The gearbox then acts only on the actual telescopic portion, preferably by means of a further part. The disposition of the electric motor and the gearbox one under the other, both accordingly below the first pivot bearing, at least as seen from above, already fills to a significant degree the space in a receiver provided for this purpose in the caster body, the receiver preferably being a vertical cylindrical receiver. The gearbox is here also formed as a cylindrical body corresponding externally to the electric motor. The vertical axis of the cylindrical body is accordingly aligned with the vertical axis of the receiver.

Further it is preferred that the gearbox drives, as a further part, initially an axially-fixed threaded sleeve. Accordingly no telescoping takes place between the gearbox and the threaded sleeve driven directly by the gearbox.

Instead of this, it is preferably further provided that the threaded sleeve is located within the vertically moveable foot part and the foot part moves vertically, thus extends or retracts vertically. The foot part moves accordingly in a telescopic manner relative to the threaded sleeve. For this purpose, a threaded engagement may be provided between the threaded sleeve and the foot part. Accordingly, the threaded sleeve has an external thread and the foot part, that is also configured in the form of a sleeve, has a matching internal thread.

The foot part itself is further preferably rotationally fixed. It can thus move only in the vertical direction. The fixing against rotation may for example be effected relative to the fixed thread, this for example by means of a vertical pin which can be extended and withdrawn in the region of the thread.

Furthermore directional detection is preferably provided. The directional detection may be achieved by a cam part comprising a sleeve in which the electric motor is fixed, the cam part being rotatable relative to the fixed housing of the caster. The cam part is for this purpose biased resiliently into its abutment position.

Further it is also provided that the pivot bearing consists in particular of two vertically spaced-apart bearings. In this connection, it is moreover preferred that the electric motor is located below the second bearing, thus below the pivot bearing as a whole.

The electric motor is further preferably accommodated in a sleeve body, which for its part is disposed in an accommodating space of the caster body to be rotationally movable relative to the accommodating space. The sleeve body is moreover fixedly connected to a mounting plate, optionally by means of a second part. By way of a fixed connection to the mounting plate, the electric motor, and also as a result the gearbox, is fixedly connected to the mounting plate. Through passages for cables are therefore not adversely affected by pivoting of the caster.

BRIEF DESCRIPTION OF THE DRAWINGS

The invention is described further below with reference to the accompanying drawings, which however represent only one exemplary embodiment. In the drawings.

DETAILED DESCRIPTION OF THE EMBODIMENTS

Figure 1:
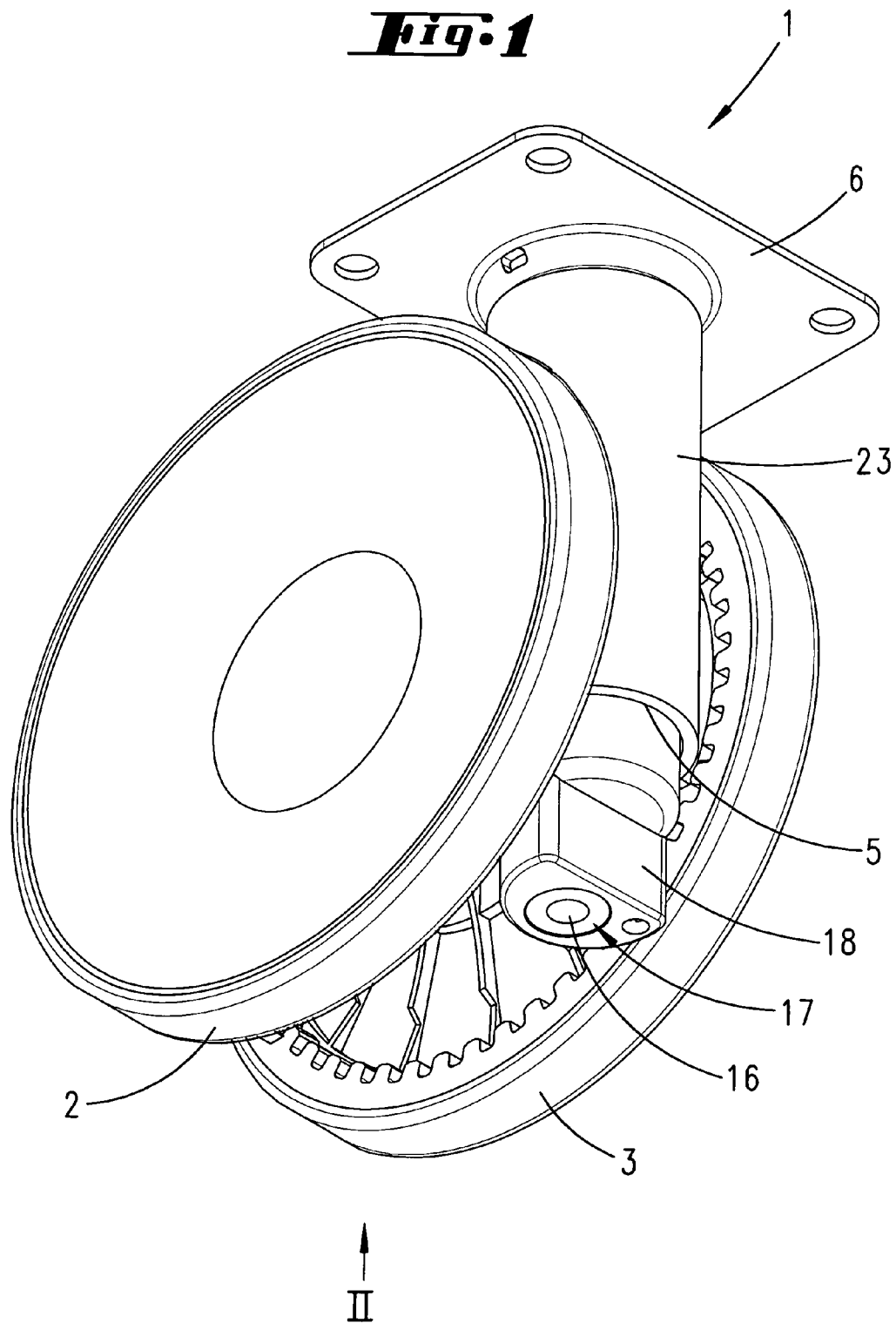
FIG. 1 shows a perspective view of the swivel caster seen at an angle from below.
Figure 2:
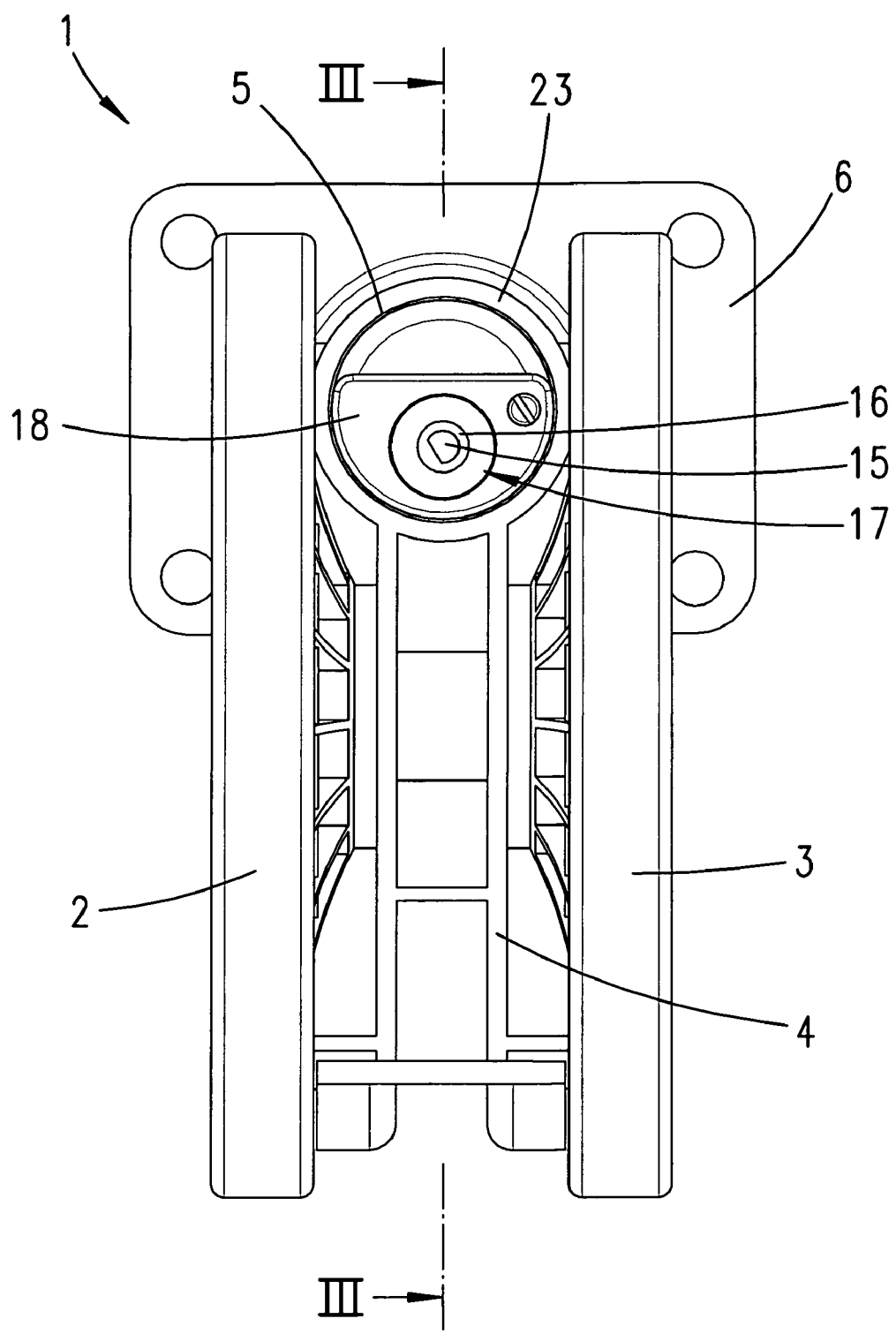
FIG. 2 shows a view from beneath of the swivel caster according to FIG. 1.
Figure 3:
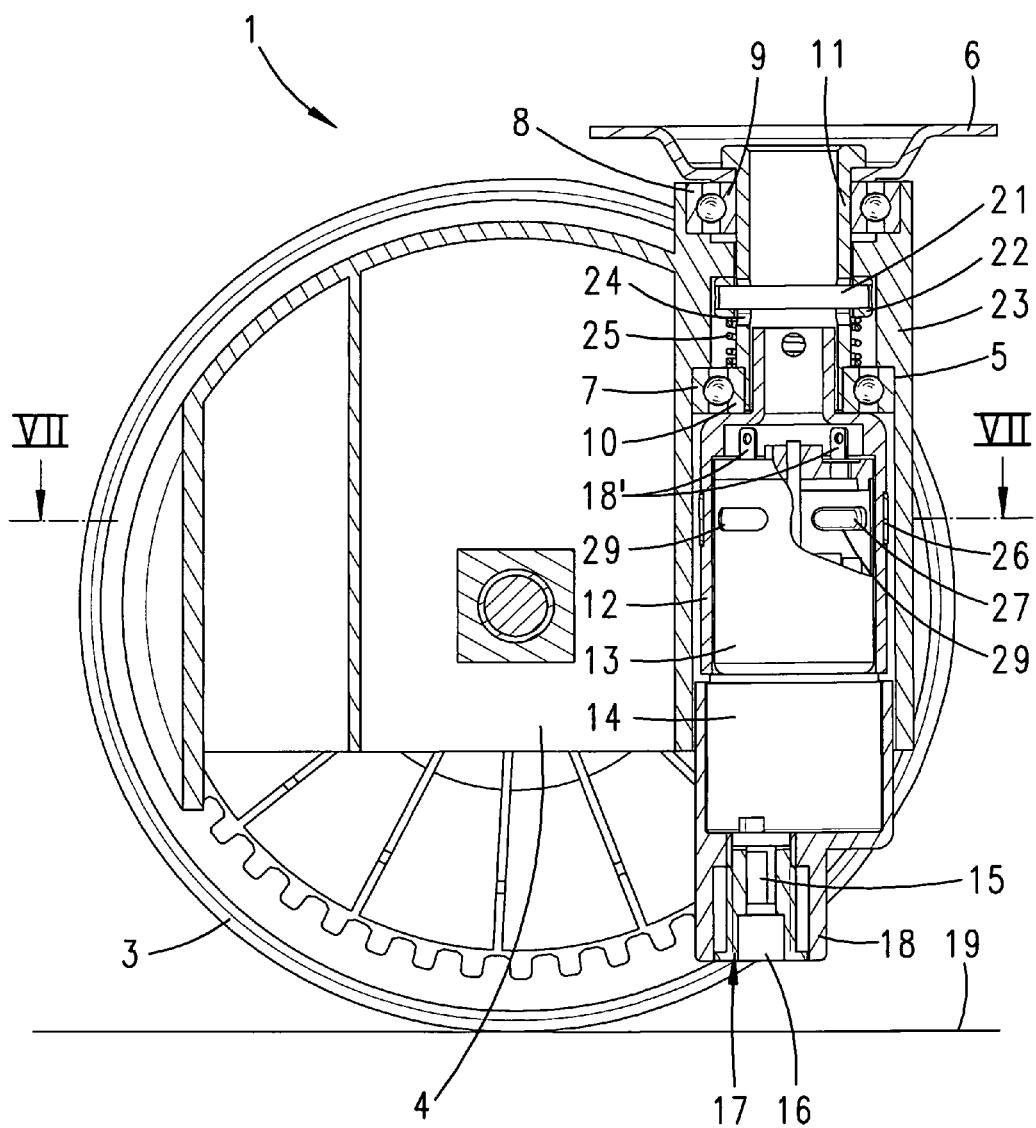
FIG. 3 shows a cross-section through the item according to FIG. 1 or FIG. 2, sectioned along the plane in FIG. 2.

Shown and described, in first instance with reference to FIGS. 1 to 3, is a swivel caster 1, which is formed as a double caster. Two wheels 2, 3 are provided, which are connected to one another by way of a housing 4. In the housing 4, there is a accommodating space 5, which is cylindrical in the exemplary embodiment. An electric motor and gearing as well as an extendable foot part are mounted in the accommodating space 5. The accommodating space 5 is aligned vertically and is, in the exemplary embodiment, between the two wheels.

At the top, a mounting plate 6 is provided, by means of which the caster 1 can be fitted for example to a hospital bed or another unit, such as for example a medical storage cabinet or the like.

As can be gathered from the sectional illustration of FIG. 3, a pivot bearing is first of all provided in the accommodating space 5, vertically at the top, the pivot bearing consisting of two bearings 7, 8 which are axially spaced apart from one another. These bearings 7, 8 are formed as ball bearings in the exemplary embodiment. A mounting sleeve 11 extends inwardly relative to the inner bearing rings 9, 10 of the bearings 7, 8, the sleeve being connected to the mounting plate 6 at its upper end, preferably fixed against rotation. The mounting sleeve 11 is also connected to the inner bearing rings of the pivot bearing (optionally to one of the inner bearing rings), preferably fixed against rotation. An accommodating sleeve 12 is also connected to the mounting sleeve 11, the sleeve 12 being formed in the exemplary embodiment to project in part into the sleeve 11, but being otherwise however disposed vertically below sleeve 11. The connection is to the mounting sleeve 11. In the portion of the accommodating sleeve 12 which is formed under the portion that projects into the mounting sleeve 11, the accommodating sleeve has preferably a greater diameter than the mounting sleeve 11. In this way, the required greatest diameter of the accommodating space is displaced still further downwardly. An electric motor 13 is located in the accommodating sleeve 12. A gearbox 14 is flanged onto the electric motor 13 on the underside.

Figure 8:
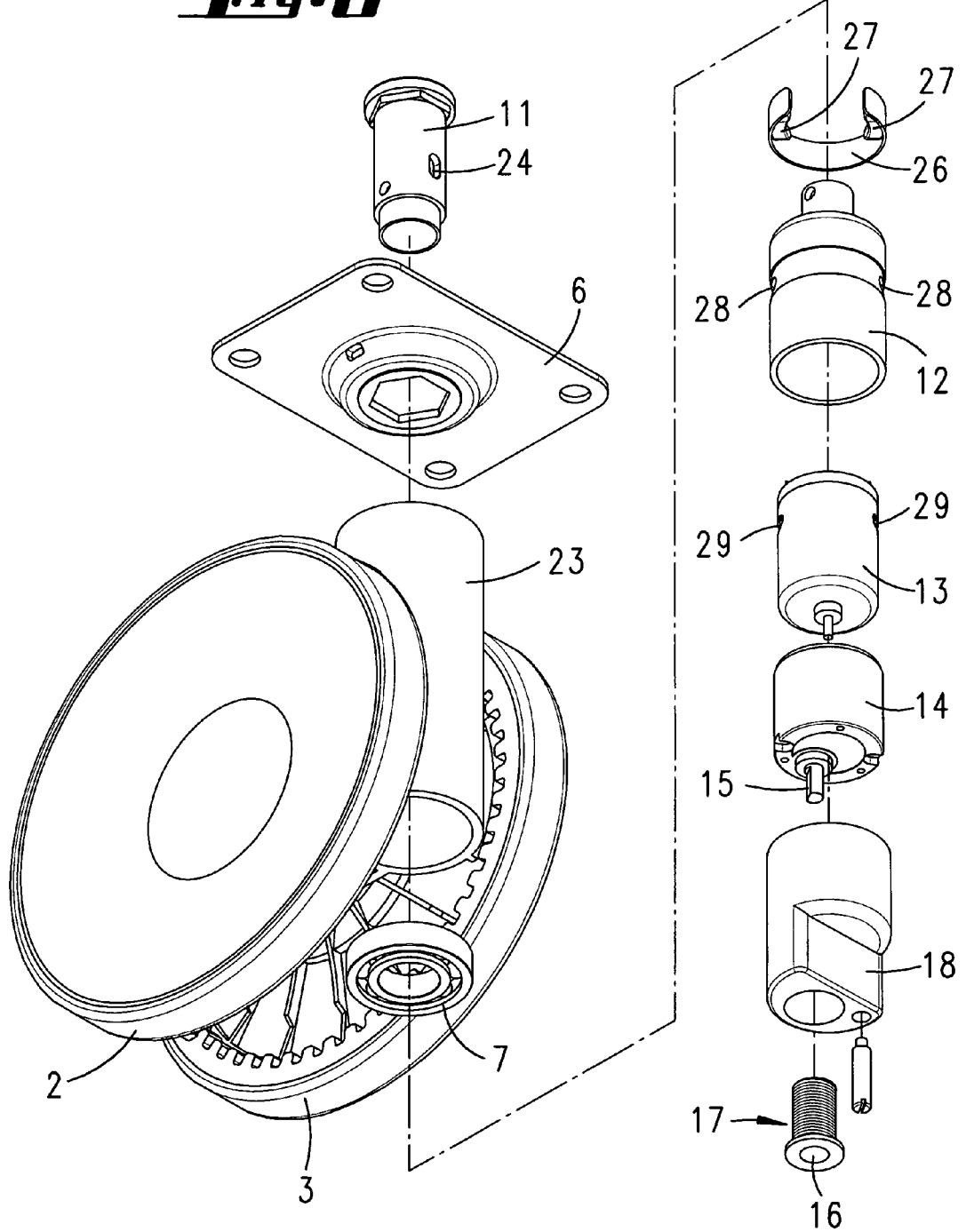
FIG. 8. is an exploded view of the caster according to FIG. 1.

The gearbox 14, see in this connection in particular FIG. 8, has a drive shaft 15 that projects downwardly and engages positively in a receiving opening 16 of the threaded sleeve 17, which is also disposed on the underside of the gearbox 14. The drive shaft 15 runs vertically.

The electric motor has in addition on its upper side electrical connections 18' from which, carried through the mounting sleeve 11, connecting wires run to a battery which is located for example in the hospital bed or the like on which the caster 1 is mounted. A control arrangement may be provided in the hospital bed or the like, by means of which the electric motor can be operated.

Figure 4:
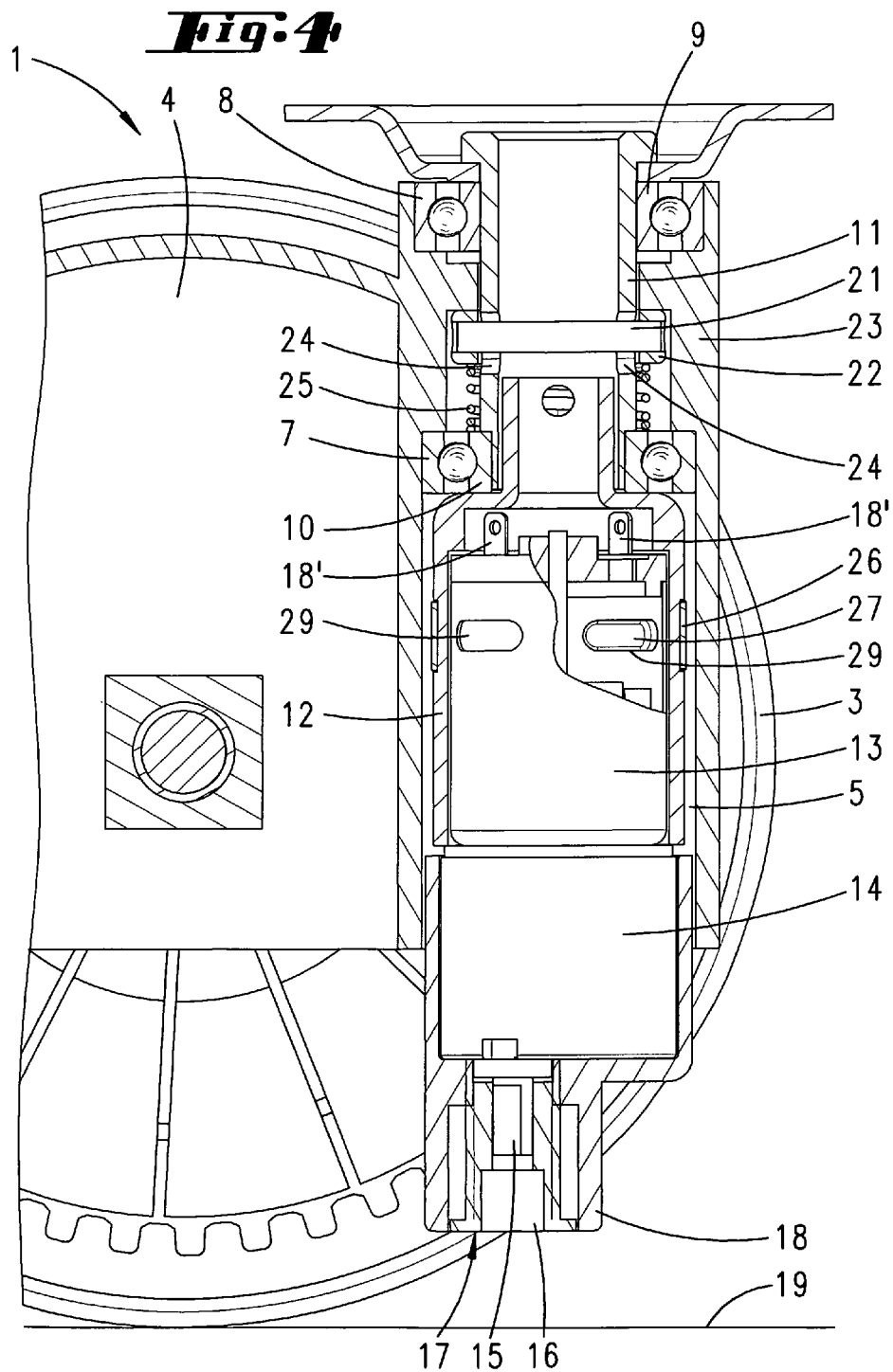
FIG. 4 shows an enlarged extract from the illustration of FIG. 2, the foot part being in the raised position.

A foot part 18 interacts with the rotatable sleeve 17 and is in threaded engagement with the sleeve 17, the foot part accordingly also being formed to be sleeve-like and engaging around the gearbox 14 on the outside in the raised condition according to FIG. 3 and FIG. 4.

Figure 5:
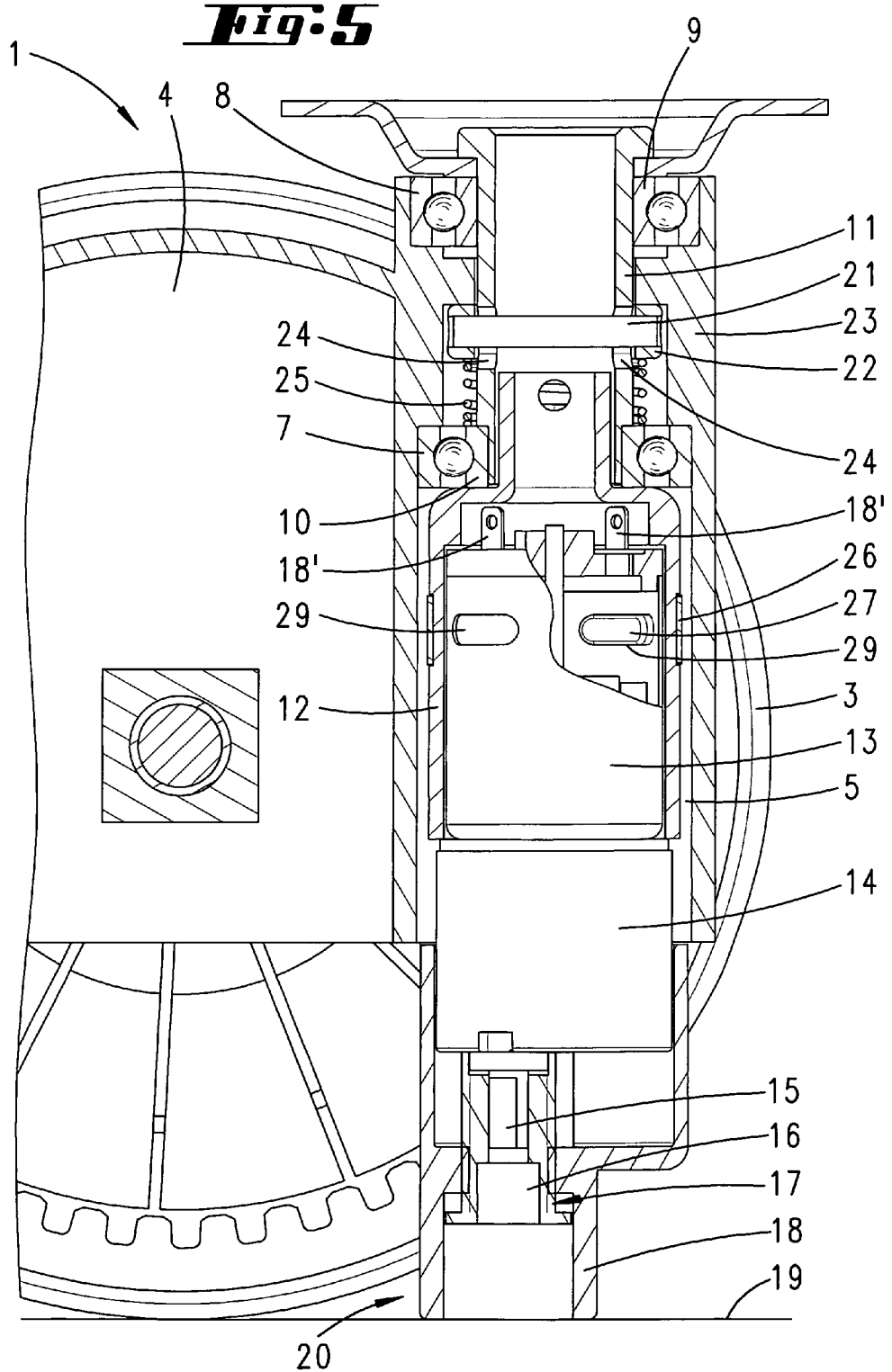
FIG. 5 shows an illustration corresponding to FIG. 4, but with the foot part lowered.

The starting position before actuation of the electric motor for fixing the caster is shown in FIG. 4. If the electric motor is now actuated to extend the foot part 18, the foot part 18 first of all travels until it is in abutment on a floor 19, see FIG. 5.

Figure 6:
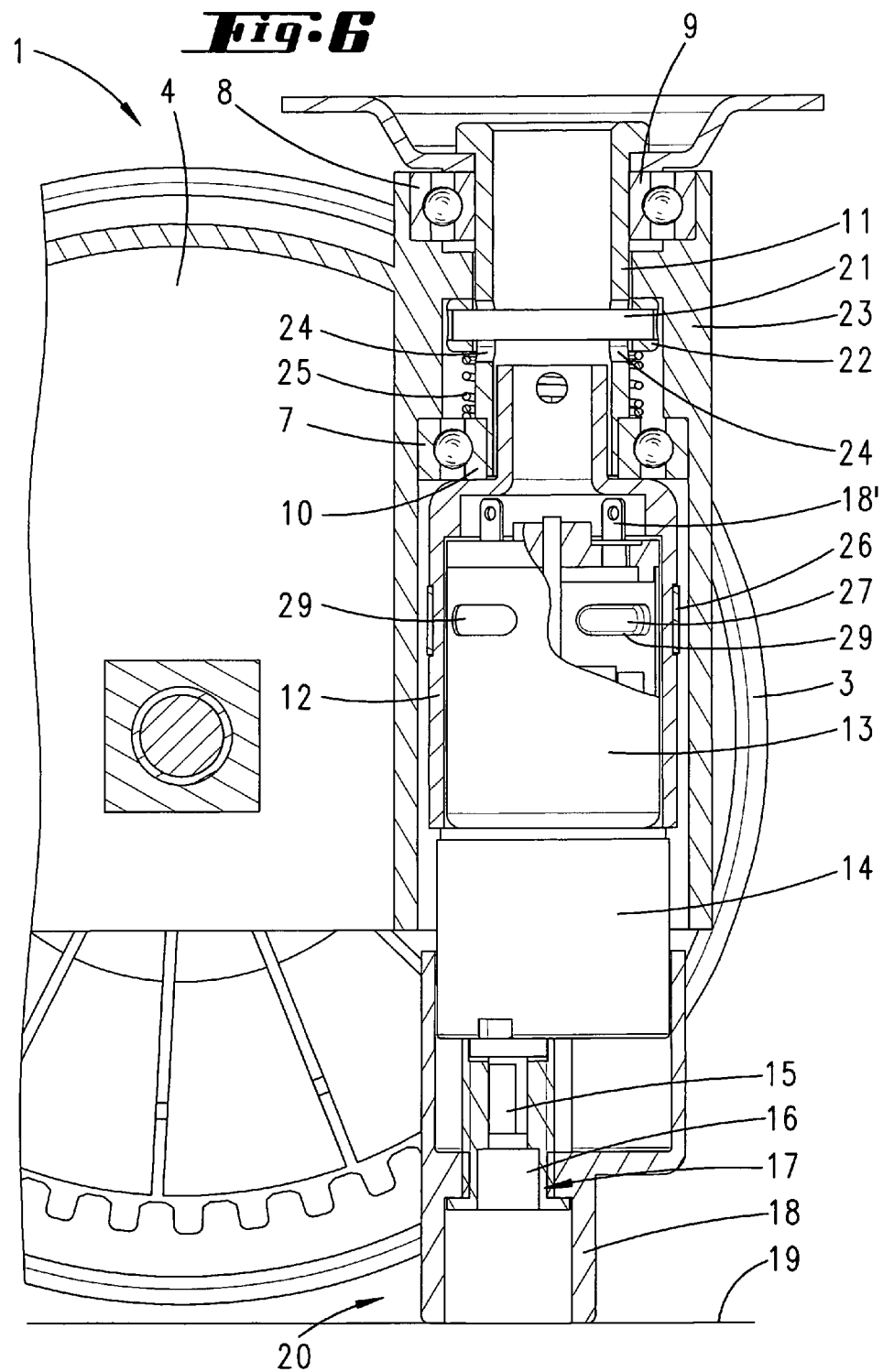
FIG. 6 shows an illustration corresponding to FIG. 5, with the foot part further extended and with the caster thereby raised.
Figure 7:
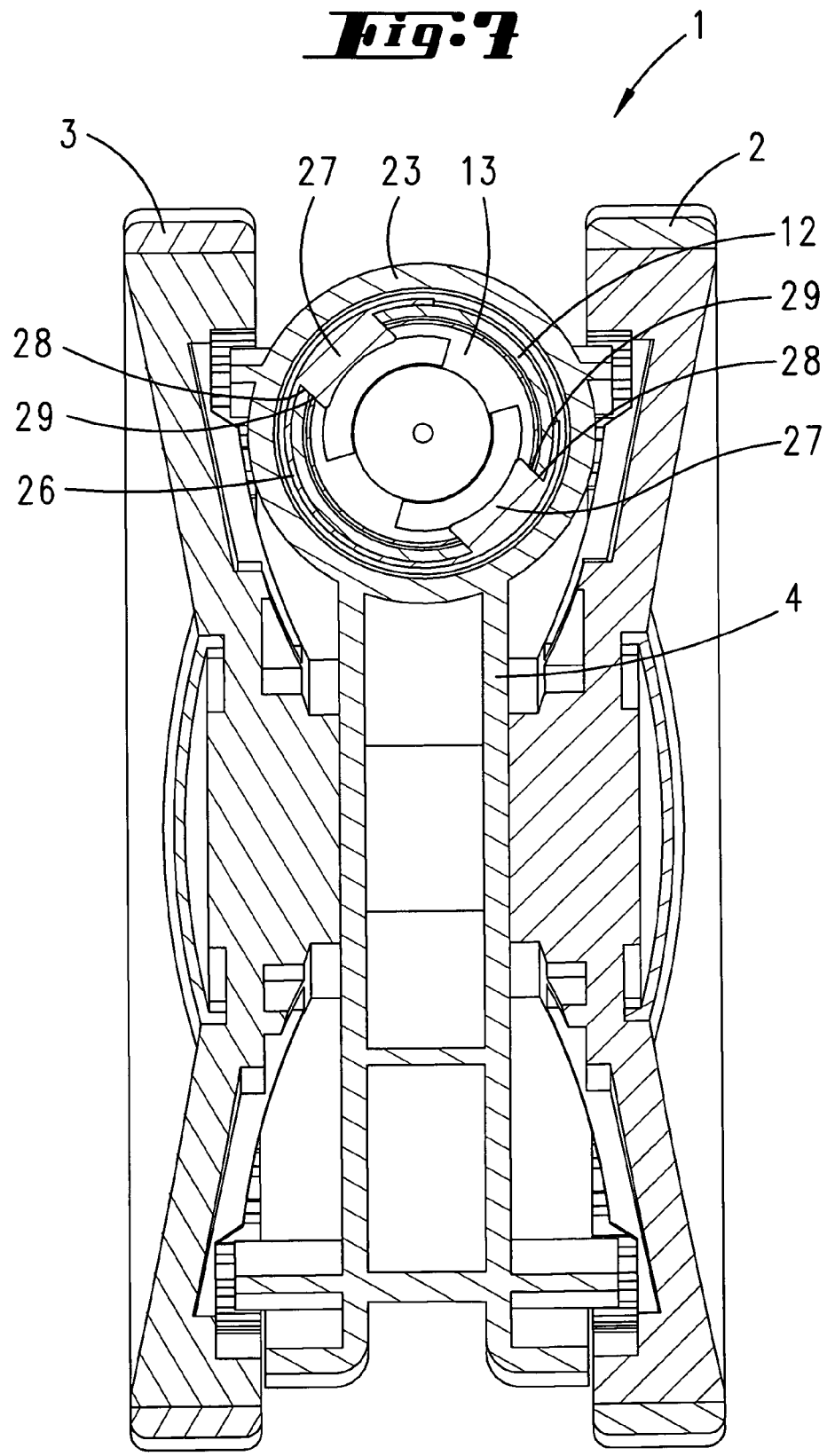
FIG. 7 shows a cross-section through the item according to FIG. 3, sectioned along the line VII-VII.

The switching of the electric motor is however furthermore so arranged that in the case that no further actuation is effected, the electric motor of the foot part 18 which is built as a floor-contacting foot pushes further from the housing so that a raising of the caster may take place according to FIG. 6. However, the switching is furthermore preferably provided so that the drive of the electric motor is terminated, if a predetermined motor current is exceeded. According to whatever weight is loaded on the caster, it may therefore also come about that the caster is not raised, but is optionally merely unloaded.

The foot part 18 has a contact region 20 which is reduced in diameter compared with the diameter of the electric motor and with that of the gearbox which is provided with practically the same diameter as the motor. Thus there is established a somewhat higher surface pressure, which brings about increased stability. In addition, obstacles can be avoided more readily. In particular, see for example FIG. 1, the base surface of the contact region corresponds to a circular surface cut away on one side in the manner of a secant.

The directional detection is achieved by means of the mounting sleeve 11. As can be gathered in particular from FIGS. 4 to 6, the mounting sleeve 11 is penetrated by a tight-fitting part 21 that passes transversely through the sleeve. The tight-fitting part 21 has here a cylindrical configuration, in the form of a pin. The tight-fitting part 21 is preferably provided with engaging rings 22 on the outside of the mounting sleeve 11. These may for example be shrunk-on or welded-on. The engaging rings 22 interact with an associated engaging recess, not shown in detail, in the accommodating member 23 that defines the accommodating space. Furthermore, a slot 24 that extends in the vertical direction is formed in the mounting sleeve 11, the part 21 being received in the slot. The part 21 is furthermore preloaded against the associated abutment region of the accommodating member 23 by means of a compression spring 25.

In normal operation, the part 21 is located in the engaging formations of the accommodating member 23. The swivel caster is thus secured in the manner of a fixed caster. If however a force action is effected, which seeks to move the hospital bed or other unit to which the casters are secured, out of the direction of movement prescribed by the engaging recesses, the part 21 may deflect downwardly against the force of the spring 25 and overrun the engaging recesses, so that the caster pivots.

In particular, it can be gathered from the exploded illustration according to FIG. 8 that the electric motor 13 and therefore also the gearbox 14 connected to it are held in the accommodating sleeve 12 by a latch connection. For this, a latch ring 26 is provided, which has engaging nubs 27 projecting inwardly.

These engaging nubs 27 engage through windows 28 in the accommodating sleeve 12 and furthermore in recesses 29 and the electric motor 13. In this way, the electric motor 13 is held in the accommodating sleeve 12.

All features disclosed are pertinent to the invention. The disclosure content of the associated/accompanying priority documents (copy of the prior application) is also included hereby as to its full content in the disclosure of the application, also for the purpose of incorporating features of these documents in claims of the present application. The subsidiary claims characterize, in their optionally subordinated structure, independent inventive further development of the state of the art, in particular for undertaking divisional applications based on these claims.

List of Reference Numbers
1. Swivel caster
2. Wheel
3. Wheel
4. Housing
5. Accommodating space
6. Mounting plate
7. Bearing
8. Bearing
9. Bearing Ring
10. Bearing Ring
11. Mounting sleeve
12. Accommodating sleeve
13. Electric motor
14. Gearbox
15. Drive shaft
16. Receiving opening
17. Threaded sleeve 18 Foot part
19. Floor
20 Contact region
21 Tight-fitting part
22. Engaging ring
23. Accommodating member
24. Slot
25. Compression spring
26. Latch ring
27. Engaging nubs
28. Window
29. Recesses

What is claimed is:

1. A swivel caster comprising:
a caster housing;
at least one caster wheel connected to the caster housing;
a pivot bearing assembly comprising at least one bearing, each bearing having one inner race fastened to a mounting means and an outer race fastened to the caster housing, such that the caster housing is adapted to swivel relative to the mounting means;
an electric motor being disposed in the caster housing below the pivot bearing assembly; and
a telescopable foot part connected to the electric motor, said foot part being adapted to be extended from and retracted into said caster housing by the electric motor.

2. The swivel caster according to claim 1, wherein the electric motor is accommodated in an accommodation space in the caster housing, said accommodation space being disposed below the pivot bearing assembly.

3. The swivel caster according to claim 1, further comprising a gearbox that is driven by the electric motor, said gearbox being located vertically below the electric motor and being adapted to move the telescopable foot part.

4. The swivel caster according to claim 3, wherein the gearbox has an axially-fixed, threaded sleeve, which is rotatable relative to the gearbox.

5. The swivel caster according to claim 4, wherein the threaded sleeve threadedly engages the foot part to move the foot part.

6. The swivel caster according to claim 5, wherein the foot part is configured as a sleeve and the threaded sleeve is disposed within the foot part.

7. The swivel caster according to claim 3, wherein the foot part is non-rotatably secured to the housing by the gearbox, so that the foot part cannot rotate relative to the housing.

8. The swivel caster according to claim 1, wherein the pivot bearing assembly consists of two individual bearings that are axially spaced from each other.

9. The swivel caster according to claim 8, further comprising means for fixing the position of the caster housing relative to the mounting means.

10. The swivel caster according to claim 9, wherein said means for fixing the position of the caster housing is provided between the individual bearings.

* * * * *